Jan. 5, 1932.  E. LAWRENZ  1,839,684
CUTTING OR THREADING TOOL
Filed March 28, 1929
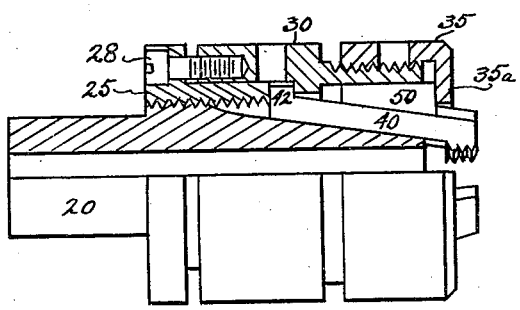
Fig. 2.
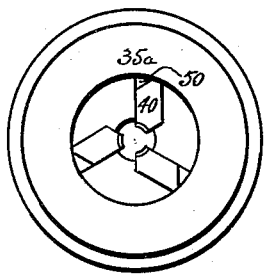
Fig. 1.
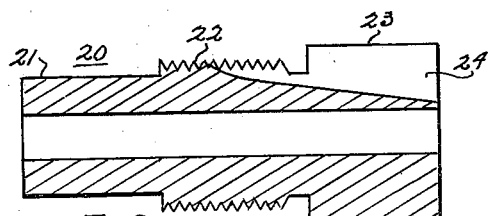
Fig. 3.
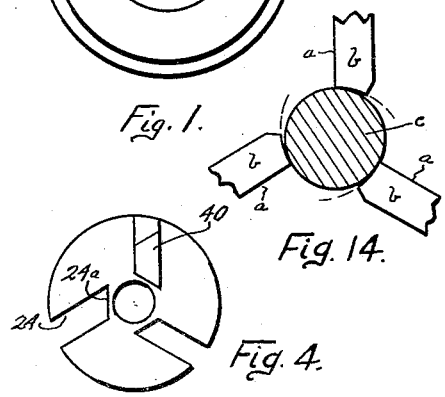
Fig. 14.
Fig. 4.
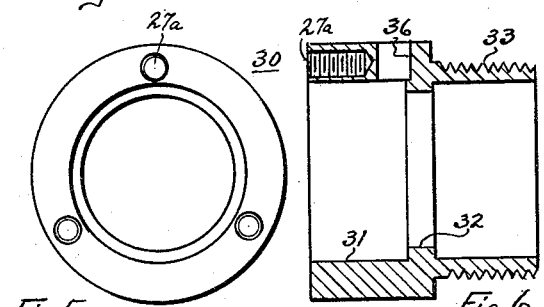
Fig. 5. Fig. 6.
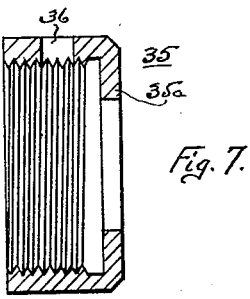
Fig. 7.
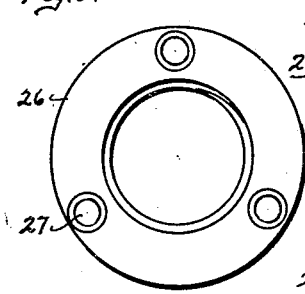
Fig. 8. Fig. 9.
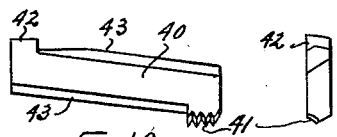
Fig. 10. Fig. 11.
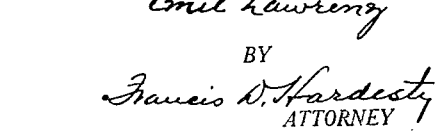
Fig. 12. Fig. 13.
INVENTOR
Emil Lawrenz
BY
Francis D. Hardesty
ATTORNEY Patented Jan. 5, 1932

1,839,684

UNITED STATES PATENT OFFICE

EMIL LAWRENZ, OF DETROIT, MICHIGAN

CUTTING OR THREADING TOOL

Application filed March 28, 1929. Serial No. 350,613.

The present invention relates to tool holders and tools for turning, thread cutting, hollow milling, and the like, and has among its objects a device of the kind indicated capable of being easily fixed in accurate adjustment over a wide range.

Heretofore, in threading dies, especially in adjustable dies for small sizes, no provision can be made for providing suitable cutting clearance and for this reason the work done by such dies is more or less unsatisfactory. In the present device such clearance is always maintained irrespective of the tool adjustment.

One of the objects of the present invention is therefore to provide for the maintenance of a proper clearance at all adjustments of the device.

Other objects will readily occur to those skilled in the art upon reference to the following description and the accompanying drawings in which Fig. 1 is an end elevation of the tool as adapted for external threading.

Fig. 2 is a side elevation with part in longitudinal section.

Fig. 3 is a longitudinal central sectional view of the tool body.

Fig. 4 is an end view of the same.

Figs. 5 and 6 are respectively an end view and a longitudinal section of the cutter holding sleeve.

Fig. 7 is a section of the wedging sleeve.

Figs. 8 and 9 are respectively an end view and section of the cutter locking sleeve.

Figs. 10 and 11 are respectively a side and end view of one of the cutters, and

Figs. 12 and 13 are similar views of one of the wedges.

Fig. 14 is a diagrammatic view showing how the clearance is maintained.

In the drawings, the tool as adapted for thread cutting, is shown as comprising a body member 20 having a shank portion 21 for mounting in a suitable operating machine, an intermediate threaded portion 22, and a head 23 provided with a plurality of longitudinal slots 24 extending from the front face of the head to a point intermediate the ends of the threaded portion, becoming shallower from the front toward the rear end and being beveled at the bottom as shown in Fig. 4 at 24a.

The threaded portion 22 of the body member cooperates with the cutter locking sleeve 25 shown in Fig. 9 and the latter consists of an internally threaded sleeve provided with a flange 26 through which are several openings 27 for the passage of screws 28, the openings 27 being counterbored to receive the heads of the screws. This sleeve is of such length as to extend from the rear of the threaded portion to near the forward end thereof and its function will be described later.

The cutter holding sleeve 30, shown in Figs. 5 and 6, consists of a sleeve portion 31 adapted to slide over the sleeve 25 being provided with tapped openings 27a to receive screws 28 and also provided with an internal flange 32 and a forward externally threaded portion 33 adapted to receive the internally threaded wedging sleeve 35, suitable openings 36 being provided whereby a spanner wrench may be used to tighten the parts 30 and 35 relatively.

The cutters are shown in Figs. 10 and 11 to consist of a relatively long body portion 40 having the cutting portion 41 at one end extending laterally from the body portion at an angle other than a right angle from the longitudinal axis of the body portion 40. At the opposite end of the cutter body is a heel 42 extending laterally in the opposite direction from the cutter portion and in a line parallel thereto. The sides of the body 43 are beveled in opposite directions so that a cross section of the cutter body between the cutting portion 41 and the heel 42 shows an isosceles trapezium.

The cutter 40 is adapted to lie in the slot 24 and is held firmly in place in the bottom thereof by means of the wedge 50 shown in Figs. 12 and 13, this element being beveled on one side thereof at 51 and having its opposite sides 52 curved to correspond with the inner curvature of the threaded portion 33 of sleeve 36.

In assembling, the tool cutters 40 are placed in the slots 24 with their heels 42 resting against the forward end of the sleeve 25. The sleeve 30 is then placed over the sleeve 25 and the internal flange 32 cooperating with the heel 42 of the cutter fixes the latter against longitudinal movement. The wedges 50 are then placed in the slots behind the cutter 40 and the sleeves 35 threaded on the portion 33 of sleeve 30, the internal flange 35a forcing the wedges 50 into close contact with the outer sides of the cutter 40 and fixing them against radial movement. After the parts have been assembled the screws 28 are inserted and cause the heels 42 to be gripped tightly between flange 32 and the forward ends of the sleeve 25 to fix the cutter against longitudinal movement.

Adjustment of the cutter is accomplished by first loosening the screws 28 and the sleeve 35 and then moving the two sleeves 25 and 30 on the threads 22 of the body. This, through the action of the heel 42 moves the cutter one way or the other in the slots 24 and therefore, causes radial adjustment of the cutter portion 41.

By arranging the slots 24 in the fashion shown, that is, with the forward or advance side wall radial of the body, the cutter in its adjustment will have its cutting edge moved along this radial line and the cutting clearance maintained. The cutting edge itself will likewise retain the same angular position with respect to the work.

In order to provide for this maintenance of the cutting clearance, the cutters are formed with the cutting faces curved on a larger radius than that of the largest work piece on which a particular cutter is to be used. This insures against the dragging of the cutter heel.

Fig. 14 illustrates diagrammatically this formation of the cutters, a being the face along which the cutters b are adjusted and c being the largest work, for example that these cutters are intended to operate upon.

Further, it should be noted that in this tool, the cutting portions of the cutters project beyond the body so as to leave clear paths for the chips to fall away from the work and thus overcome the difficulties due to clogging.

Now, having described the invention and the preferred forms of embodiment thereof, it is to be understood that the said invention is to be limited, not to the specific details herein described and illustrated, but only by the scope of the claims which follow:

I claim:—

1. An external cutting tool comprising a body member having a slot in its outer periphery, said slot decreasing in depth from the forward end of the body, a cutter in said slot having a heel portion projecting outwardly from said slot and a cutting portion projecting forwardly of said slot, a member adjustably secured to said body and disposed in back of said heel, an annular member adjustably secured to the last mentioned member and disposed in front of said heel, whereby movement of one of said members towards the other serves to clamp said heel and thereby secure said cutter against longitudinal movement with respect to said body, and releasable means to prevent movement of said members with respect to each other, said releasable means serving to hold said members to each other, whereby they, while holding the cutter between them, may be secured to or removed from the body as a unit.

2. An external cutting tool comprising a body member having a slot in its outer periphery, said slot decreasing in depth from the forward end of the body, a cutter in said slot having a heel portion projecting outwardly from said slot and a cutting portion projecting forwardly of said slot, a member adjustably secured to said body and disposed in back of said heel, an annular member adjustably secured to the last mentioned member and disposed in front of said heel, whereby movement of one of said members towards the other serves to clamp said heel and thereby secure said cutter against longitudinal movement with respect to said body, and a wedge in said slot between said second member and said cutter and serving as a means to cause radial movement of said cutter to be responsive to movement of said second member.

3. An external cutting tool comprising a body member having a slot in its outer periphery, said slot decreasing in depth from the forward end of the body, a cutter in said slot having a heel portion projecting outwardly from said slot and a cutting portion projecting forwardly of said slot, a member adjustably secured to said body and disposed in back of said heel, an annular member adjustably secured to the last mentioned member and disposed in front of said heel, whereby movement of one of said members towards the other serves to clamp said heel and thereby secure said cutter against longitudinal movement with respect to said body, and a wedge in said slot between said second member and said cutter, and serving as a means to cause radial movement of said cutter to be responsive to movement of said second member, said second member having a portion projecting inwardly therefrom to prevent undesired movement of said wedge.

4. An external cutting tool comprising a body member having a slot in its outer periphery, said slot decreasing in depth from the forward end of the body, a cutter in said slot having a heel portion projecting outwardly from said slot and a cutting portion projecting forwardly of said slot, a member adjustably secured to said body and disposed in back of said heel, an annular member adjustably secured to the last mentioned member and disposed in front of said heel, whereby movement of one of said members towards the other serves to clamp said heel and thereby to secure said cutter against longitudinal movement with respect to said body and releasable means to prevent movement of said members with respect to each other, said releasable means serving to hold said members to each other, whereby they, while holding the cutter between them, may be secured to or removed from the body as a unit, two of the walls of the slot and two of the walls of the cutter intersecting in an acute angle so that as the cutter is forced inwardly in the slot, it will be biased towards a wall of the latter.

5. An external cutting tool comprising a body member having a slot in its outer periphery, said slot decreasing in depth from the forward end of the body, a cutter in said slot having a heel portion projecting outwardly from said slot and a cutting portion projecting forwardly of said slot, a member adjustably secured to said body and disposed in back of said heel, an annular member adjustably secured to the last mentioned means and disposed in front of said heel, whereby movement of one of said members towards the other serves to clamp said heel and thereby secure said cutter against longitudinal movement with respect to said body, and a wedge in said slot between said second member and said cutter and serving as a means to cause radial movement of said cutter to be responsive to movement of said second member, said second member having a portion projecting inwardly therefrom to prevent undesired movement of said wedge, two of the walls of the slot and two of the walls of the cutter intersecting in an acute angle so that as the cutter is forced inwardly in the slot, it will be biased towards a wall of the latter.

EMIL LAWRENZ.